(12) United States Patent
Hoshi (10) Patent No.: US 9,563,237 B2
(45) Date of Patent: Feb. 7, 2017

(54) INPUT APPARATUS, ELECTRONIC APPARATUS AND TOUCH PAD

(71) Applicant: FUJITSU LIMITED, Kawasaki-shi, Kanagawa (JP)

(72) Inventor: Masahiko Hoshi, Katsushika (JP)

(73) Assignee: FUJITSU LIMITED, Kawasaki (JP)

( * ) Notice: Subject to any disclaimer, the term of this patent is extended or adjusted under 35 U.S.C. 154(b) by 347 days.

(21) Appl. No.: 14/177,331

(22) Filed: Feb. 11, 2014

(65) Prior Publication Data

US 2014/0293157 A1 Oct. 2, 2014

(30) Foreign Application Priority Data

Mar. 29, 2013 (JP) ................................. 2013-074186

(51) Int. Cl.
*G06F 1/16* (2006.01)

(52) U.S. Cl.
CPC ............ *G06F 1/169* (2013.01); *G06F 1/1616* (2013.01)

(58) Field of Classification Search
None
See application file for complete search history.

(56) References Cited

U.S. PATENT DOCUMENTS

| 2011/0149523 A1* | 6/2011 | Yanagida | G06F 1/1616 361/724 |
| 2011/0149534 A1* | 6/2011 | Hamada | G06F 1/169 361/756 |
| 2011/0249383 A1* | 10/2011 | Horii | G06F 1/169 361/679.01 |
| 2012/0162892 A1* | 6/2012 | Hirai | G06F 1/1681 361/679.28 |

FOREIGN PATENT DOCUMENTS

| JP | 2002-46789 A | 2/2002 |
| JP | 2013-8123 A | 1/2013 |

* cited by examiner

*Primary Examiner* — Jason Olson
*Assistant Examiner* — Krishna Neupane
(74) *Attorney, Agent, or Firm* — Westerman, Hattori, Daniels & Adrian, LLP (57) ABSTRACT

An input apparatus includes: a touch pad configured to detect a touched position on an input surface; a click button provided on a rear surface of the touch pad; and a touch pad cover including a through hole through which the click button passes, the touch pad cover being attached to the rear surface of the touch pad, wherein the touch pad cover includes: a mount configured to reduce deflection on an upper end of the touch pad cover; and a plurality of ribs, arranged at intervals on a rear surface of the touch pad cover, configured to distribute depression force to a first side of the touch pad cover when the depression force is applied on the input surface.

20 Claims, 10 Drawing Sheets

SECTION D-D

INPUT APPARATUS, ELECTRONIC APPARATUS AND TOUCH PAD

CROSS-REFERENCE TO RELATED APPLICATION

This application is based upon and claims the benefit of priority of the prior Japanese Patent Application No. 2013-074186, filed on Mar. 29, 2013, the entire contents of which are incorporated herein by reference.

FIELD

The embodiments discussed herein are related to an input apparatus and an electronic apparatus.

BACKGROUND

The related-art technology is disclosed in Japanese Lain-open Patent Publication No. 2013-8123.

SUMMARY

According to an aspect of the embodiments, an input apparatus includes: a touch pad configured to detect a touched position on an input surface; a click button provided on a rear surface of the touch pad; and a touch pad cover including a through hole through which the click button passes, the touch pad cover being attached to the rear surface of the touch pad, wherein the touch pad cover includes: a mount configured to reduce deflection on an upper end of the touch pad cover; and a plurality of ribs, arranged at intervals on a rear surface of the touch pad cover, configured to distribute depression force to a first side of the touch pad cover when the depression force is applied on the input surface.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1A:
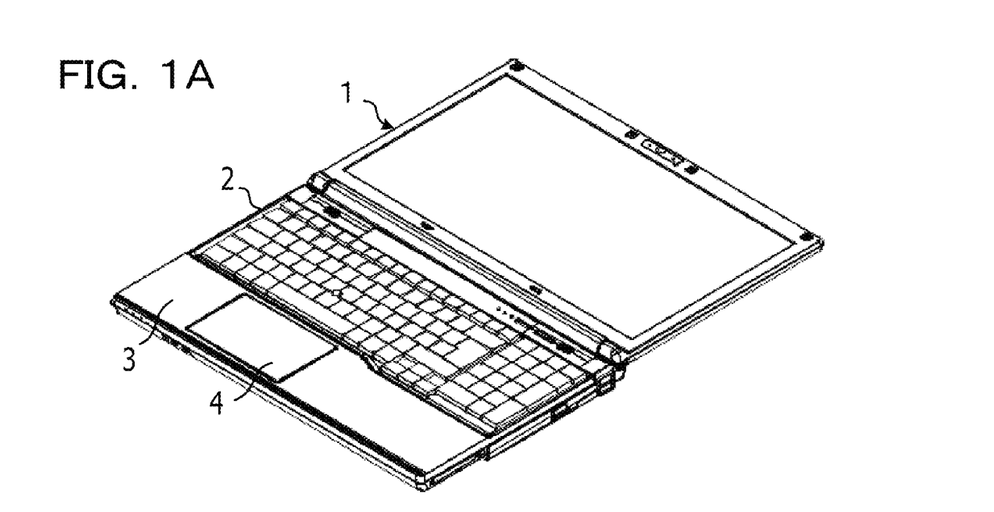
FIGS. 1A, 1B, and 1C depict an example of a notebook personal computer.
Figure 1B:
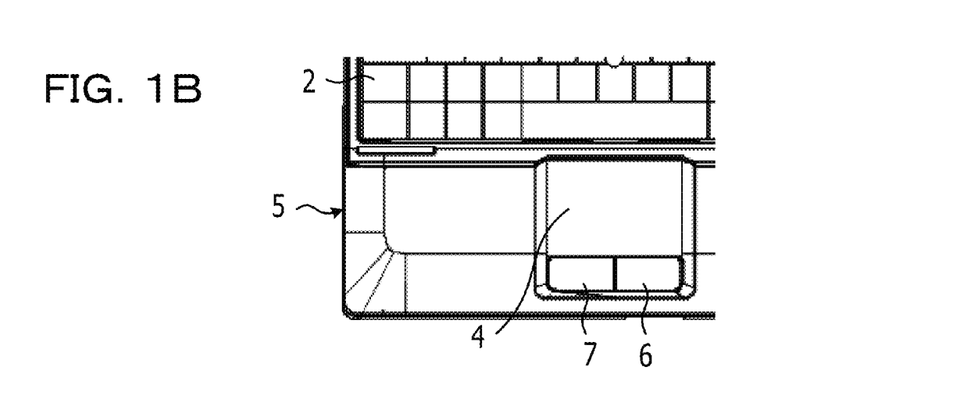
Figure 1C:
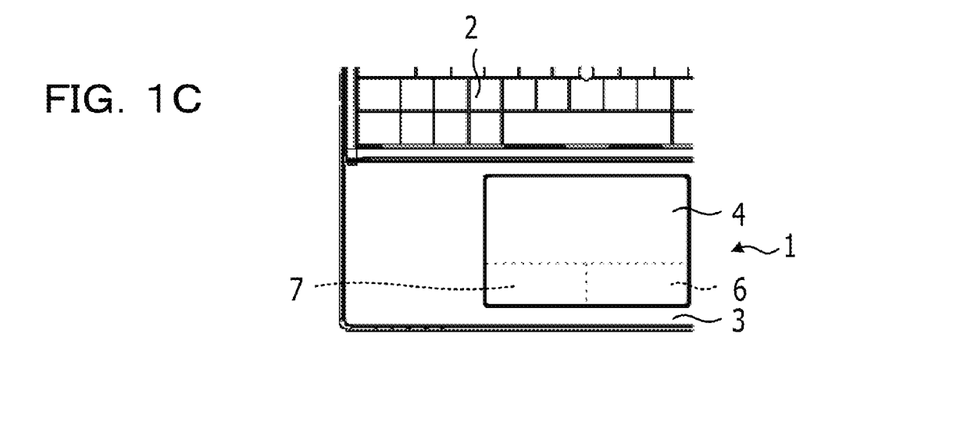

FIGS. 1A, 1B, and 1C depict an example of a notebook personal computer. When, for example, a new OS is installed in a notebook personal computer 1 depicted in FIG. 1A, a touch pad of a large size is disposed on a panel 3 adjacent to a keyboard section 2.

In a notebook personal computer 5 depicted in FIG. 1B in which a new OS has not been installed yet, an independent right-click button 6 and an independent left-click button 7 are disposed in a lower part of a touch pad 4 on the panel 3 adjacent to the keyboard section 2. In a notebook personal computer 1 depicted in FIG. 1C in which the new OS is installed, the right-click button 6 and the left-click button 7 are present in the touch pad 4 of a larger size. The touch pad depicted in FIG. 1C has the structure different from that of the touch pad and the click button depicted in FIG. 1B.

For example, in an input apparatus in which a touch pad, a reinforcing plate, and a supporting plate are superimposed in this order, the supporting plate is secured to the housing at three points (left and right sides of the front end side and the middle of the rear end side) and a switch receptacle is disposed in a triangle formed by these three securing points.

For example, in the input apparatus above, when the switch element is pressed, the entire touch pad is dented and the appearance may deteriorate. The reinforcing plate is inserted between the touch pad and the supporting plate so as to reduce an erroneous pressing of the touch pad by the deformation of the touch pad. This increases the number of components and makes the structure complicated, thereby possibly increasing the production cost.

In an input apparatus, an undeflectable area and a deflectable area are provided in a large touch pad, and, only when pressing the deflectable area, the touch pad deflects and the switch element starts operating (clicking).

Figure 2A:
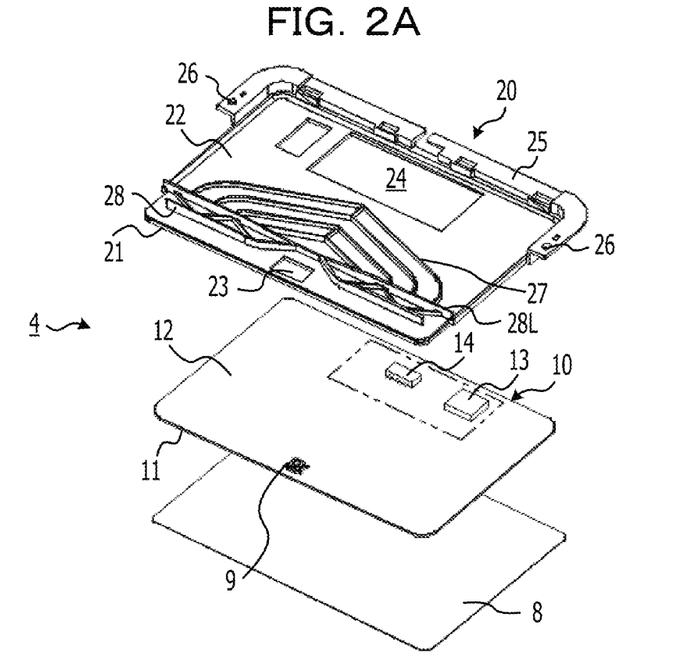
FIG. 2A depicts an example of a touch pad.

FIG. 2A depicts an example of a touch pad. FIG. 2A is a perspective view depicting the assembly of a touch pad 4, which is an input apparatus including a touch pad cover 20. The touch pad 4 may be, for example, an input apparatus mounted on a keyboard section 2 of the notebook personal computer 1, which is the electronic apparatus depicted in FIG. 1A. The touch pad 4 includes a touch pad unit 10, which detects a touched position on the input surface, and the touch pad cover 20, which is attached to the rear surface of the touch pad unit 10. A glazed sheet 8 is attached to the upper surface of the touch pad unit 10. Hereinafter, the side of the touch pad 4 closed to the keyboard section 2 is called the upper end side and the side away from the keyboard section 2 is called the lower end side. Also in the touch pad unit 10 and the touch pad cover 20, the side close to the keyboard section 2 is called the upper end side and the side away from the keyboard section 2 is called the lower end side.

A click button 9 is mounted in the middle of the lower end part on the rear surface of the touch pad unit 10. A connector 14 is disposed in the middle in the vicinity of the upper end part. A controller IC 13 is mounted in a section adjacent to the connector 14. The touch pad cover 20 attached to the rear surface of the touch pad unit 10 has, therein, a window 23 through which the click button 9 mounted on the rear surface of the touch pad unit 10 passes and an opening 24 that keeps the touch pad cover 20 from making contact with the controller IC 13 and the connector 14. Accordingly, in a state where the touch pad cover 20 is attached to the rear surface of the touch pad unit 10, the click button 9 may be exposed through the window 23 and the controller IC 13 and the connector 14 may be exposed through the window 24.

On the rear surface of the touch pad cover 20, a plurality of deflection correcting ribs 27 are disposed at certain intervals. The plurality of deflection correcting ribs 27 distribute more depression force when the input surface of the lower end side of the touch pad unit 10 is pressed to the sides of the touch pad cover 20. On the rear surface of the touch pad cover 20, a reinforcing rib 28 is disposed on the lower end side adjacent to the deflection correcting ribs 27.

Figure 2B:
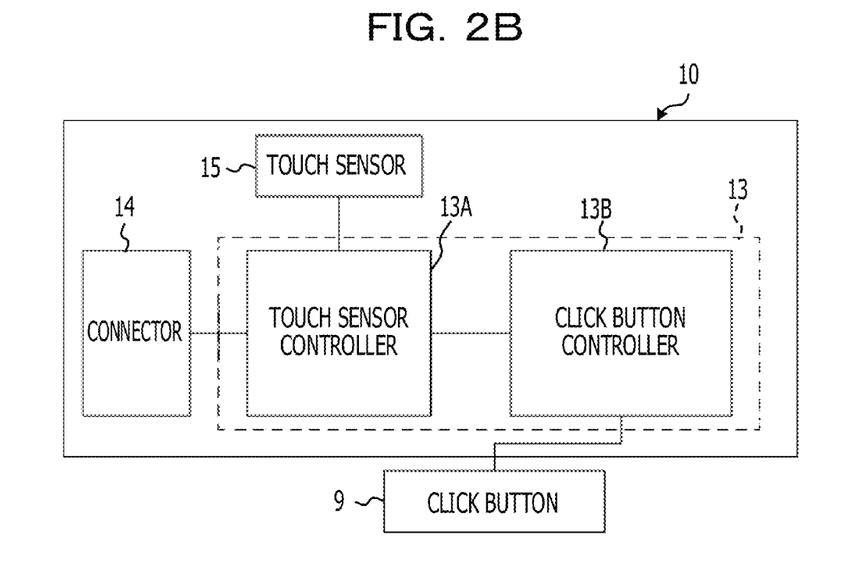
FIG. 2B depicts a structure of a circuit of a touch pad.

FIG. 2B depicts a circuit of a touch pad. In FIG. 2B, a block diagram illustrating the circuit structure of the touch pad 4 in FIG. 2A is depicted. The controller IC 13 includes a touch sensor controller 13A and a click button controller 13B coupled to the touch sensor controller 13A. The touch sensor controller 13A is coupled to a touch sensor 15, which detects an input to the touch pad unit 10, and the click button controller 13B is coupled to the click button 9. The touch sensor controller 13A is coupled to the connector 14.

In the touch pad unit 10, a touch input to the input surface is detected by the touch sensor 15 and the touch sensor controller 13A. When the touch pad unit 10 is of a capacitive type, grid-like X electrodes (for example, 16) and Y electrodes (for example, 12) for detecting, for example, finger operation are disposed on the input surface of the touch pad unit 10 and electric energy is stored between the electrodes. If no operation is performed on the input surface, the two types of electrodes form a stable electric field. When fingers of a human that function as a ground come close to the input surface, the electric field changes. When the fingers make contact with the input surface, the capacitance reduces at the position with which the fingers make contact. The touch sensor controller 13A detects changes in the capacitance and the coordinates (touch position) at which the fingers made contact with the input surface.

When the lower end side of the touch pad unit 10 is pressed with a finger and the click button 9 is pressed, the click button controller 13B determines whether a right click or a left click has been performed based on touch position detection results from the touch sensor controller 13A. For example, when the lower end side of the touch pad unit 10 is pressed to press the click button 9, the click button controller 13B determines whether the right side or the left side of the touch pad unit 10 has been pressed, based on the results from the touch sensor controller 13A. When the right side of the touch pad unit 10 has been pressed, the click button controller 13B assumes a right click. When the left side of the touch pad unit 10 has been pressed, the click button controller 13B assumes a left click. Information about the touch position and information indicating a right or left click are input to the controller of the personal computer via the connector 14.

Figure 3A:
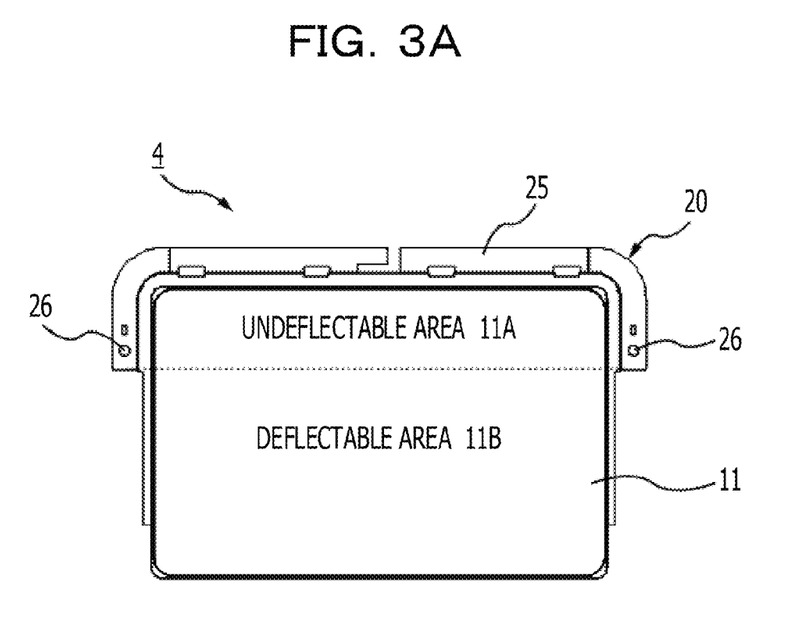
FIG. 3A is a front plan view of a touch pad.
Figure 3B:
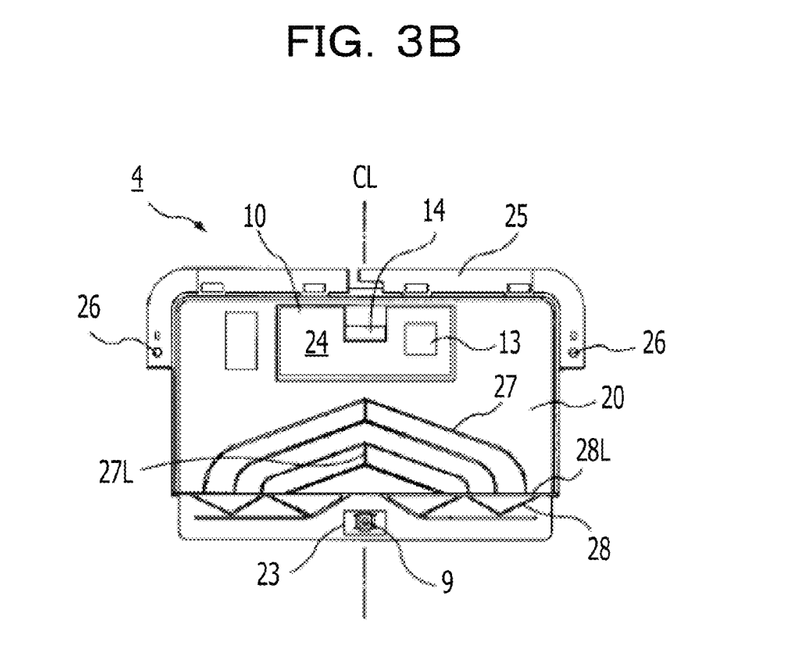
FIG. 3B is a back plan view of a touch pad.

FIG. 3A is a front plan view of a touch pad. FIG. 3A depicts the upper side after the touch pad 4 depicted in FIG. 2A is assembled. FIG. 3B is an example of a back plan view of a touch pad. FIG. 3B depicts the rear surface of touch pad 4 depicted in FIG. 3A. An undeflectable area 11A and a deflectable area 11B are disposed on the upper surface (touch input surface) 11 of the touch pad unit 10 that forms the touch pad 4. The structure of the touch pad cover 20 attached to the rear surface of the touch pad unit 10 may determine whether the touch pad unit 10 is deflectable or undeflectable.

A planar mount 25, which is formed integrally with the touch cover 20 and extends from the touch cover 20 to an external, is provided in the upper end part of the touch pad cover 20 and both sides with a certain length from the upper end part to the lower end part. For example, a step is disposed between the touch pad cover 20 and the mount 25. Securing holes 25A are disposed at certain intervals in the section of the mount 25 adjacent to the upper end part of the touch pad cover 20. A screw hole 26 is disposed in each of both ends of the mount 25. For example, the number of securing holes 25A disposed in the mount 25 may be four.

An opening 24 is disposed in the vicinity of the upper end part of the touch pad cover 20. When the touch pad unit 10 is attached to the upper surface of the touch pad cover 20, the controller IC 13 and the connector 14 disposed on the rear surface of the touch pad unit 10 are exposed in the opening 24. The controller IC 13 and the connector 14 position on the rear surface of the undeflectable area 11A of the touch pad unit 10. The window 23 is disposed in the middle close to the lower end part of the touch pad cover 20. The click button 9 disposed on the rear surface of the touch pad unit 10 is exposed in the window 23 when the touch pad unit 10 is attached to the upper surface of the touch pad cover 20.

The ribs 27 and the rib 28, which have mutually different functions, are disposed on an area provided lower than the lower end side of the opening 24 disposed in the touch pad cover 20. The ribs 27 are the deflection correcting rib, which distributes more depression force to the sides of the touch pad cover 20 when the input surface at the lower end side of touch pad unit 10 is pressed. The plurality of ribs 27 may be disposed symmetrically about the center line CL of the touch pad cover 20. The rib 28 may be a reinforcing rib that reinforces the lower end side of the touch pad cover 20 and is disposed on both sides of the window 23 on the rear surface of the touch pad cover 20. The reinforcing rib 28 includes a linear rib 28L disposed in a direction orthogonal to the center line CL on the upper end side of the window 23. The linear rib 28L functions as a border between the two types of ribs 27 and 28.

The number of ribs 27 may be four. The ribs 27 are disposed obliquely with respect to the center line CL so as to begin with the center line CL of the touch pad cover 20 and ends with the linear rib 28L. The lowermost rib 27 is coupled to the linear rib 28L as a straight line. The other ribs 27 are coupled to the linear rib 28L via curved portions that are curved in the vicinity of the linear rib 28L. The first and second ribs are coupled to a communication rib 27L and the third and fourth ribs are coupled to another communication rib 27L on the center line CL. The communication ribs 27L may be disposed for each pair of ribs 27 or may be disposed in positions away from the center line CL in parallel with them, instead of on the center line CL.

Figure 4A:
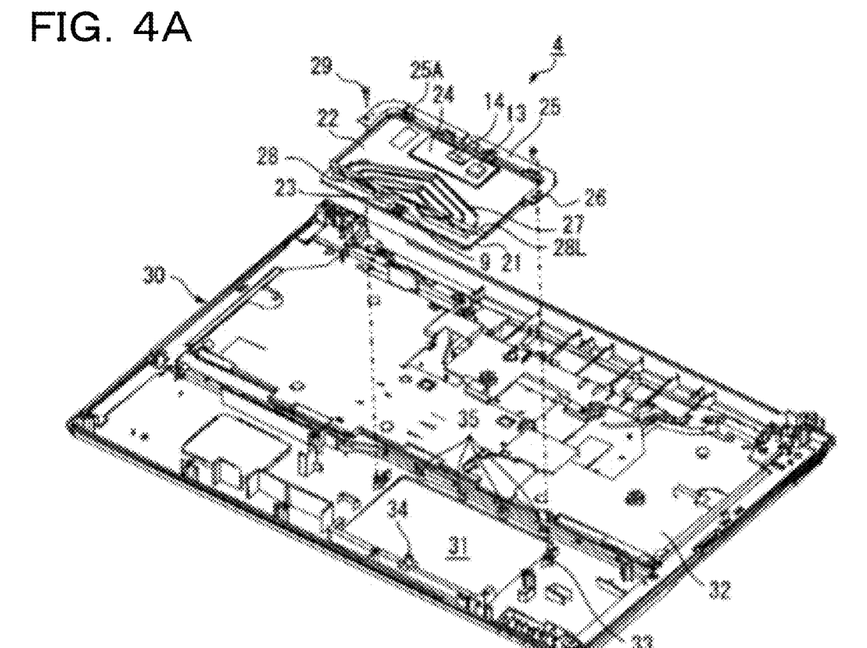
FIG. 4A is an example of a perspective view depicting an assembly of the notebook personal computer.

FIG. 4A is an example of a perspective view depicting an assembly of a notebook personal computer. As depicted in FIG. 4A, a touch pad installation hole 31 is disposed in an upper housing 30 of the notebook personal computer, which is an input apparatus on which the touch pad 4 is mounted. Four latches 35 corresponding to the securing holes 25A disposed in the touch pad cover 20 are disposed at an end (upper end side of the touch pad 4) of the inside of the installation hole 31. Bosses 33 corresponding to screw holes 26 disposed in the touch pad cover 20 are disposed on both ends of the touch pad installation hole 31 that are closer to the latches 35. In the end (lower end side of the touch pad 4) of the outer perimeter of the touch pad installation hole 31, a depressing projection 34 is disposed in a position corresponding to the click button 9 disposed on the touch pad cover 20.

Figure 4B:
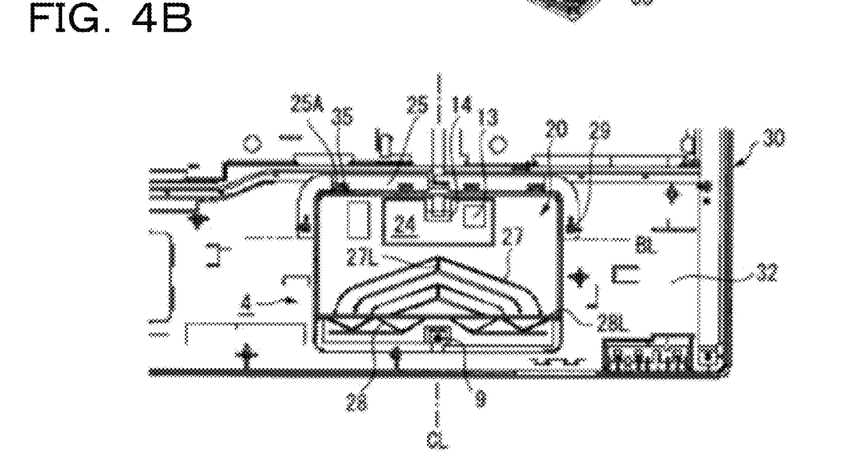
FIG. 4B is a partial rear view depicting a touch pad.

When the four latches 35 are engaged in the four securing hole 25A, the touch pad 4 is attached to the touch pad installation hole 31, and the mount 25 is secured to the bosses 33 by the screws 29 passing through the screw holes 26. FIG. 4B is a partial rear view depicting a touch pad. FIG. 4B depicts the state where the touch pad 4 is attached and secured to the installation hole 31. As depicted in FIG. 4B, the upper end side of the touch pad cover 20 is secured by causing the four latches 35 to be engaged in the four securing holes 25A in the mount 25, and both ends of the mount 25 are secured to the bosses 33 with the screws 29. Since the upper end side of the touch pad cover 20 surrounded by the mount 25 is tightly secured to the upper cabinet 30 by the screws 29 and the latches 35, the undeflectable area 11A of the touch pad unit 10 present on the rear surface of the area may not be deflected.

Figure 5A:
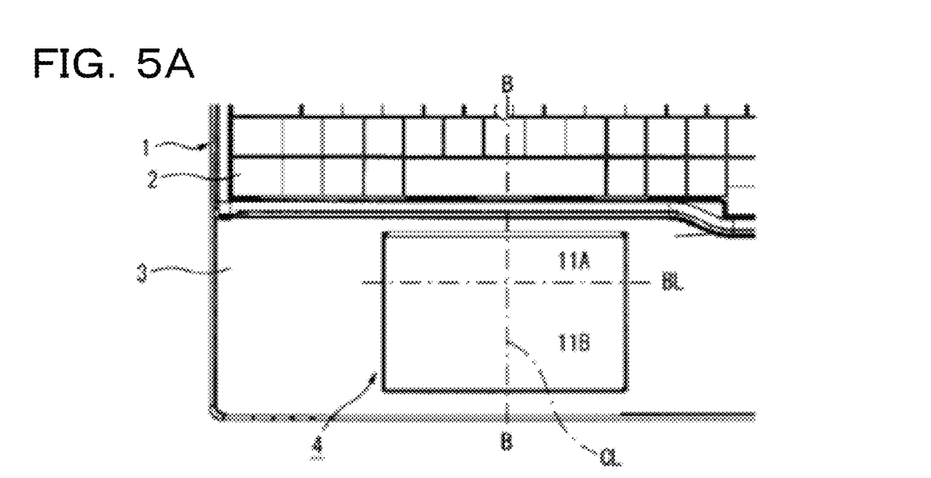
FIG. 5A depicts an example of an upper housing of a notebook personal computer.
Figure 5B:
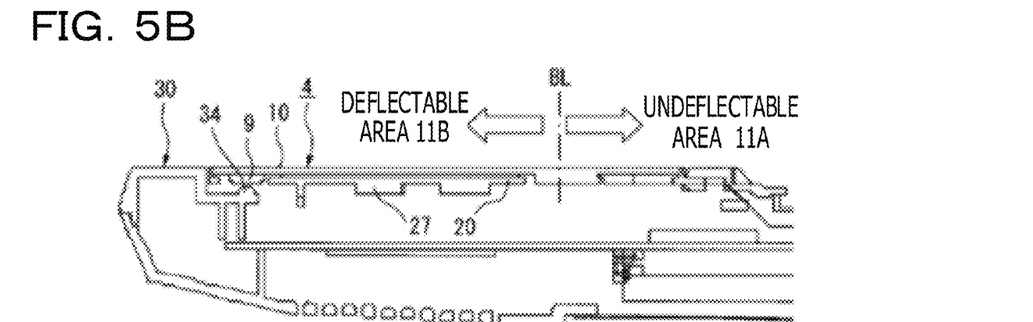
FIG. 5B is a sectional view depicting section B-B (center line CL) in FIG. 5A.
Figure 5C:
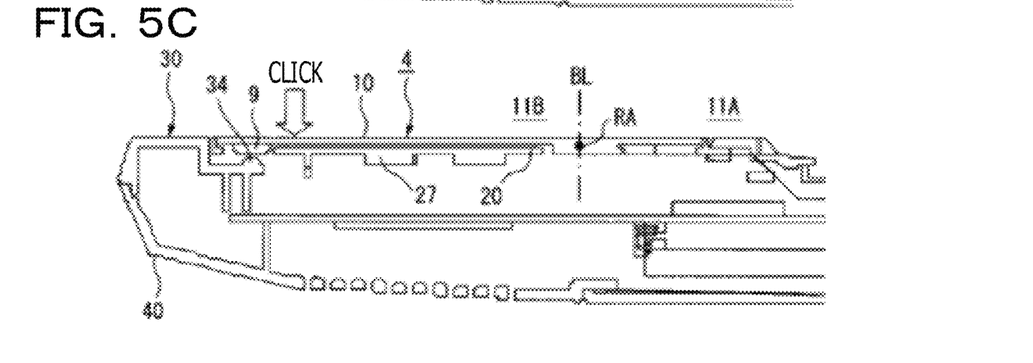
FIG. 5C depicts an example of a state of click operation.

FIG. 5A depicts an example of an upper housing of a notebook personal computer. FIG. 5A depicts the side (upper surface) opposite to the rear surface of the upper housing 30 of the notebook personal computer depicted in FIG. 4B. FIG. 5B is a sectional view depicting section B-B (center line CL) in FIG. 5A. FIG. 5C depicts an example of a state of click operation. FIG. 5C is a sectional view depicting the states of individual components when click operation is performed in the state depicted in FIG. 5B. A border BL between the undeflectable area 11A and the deflectable area 11B may be the same as the line BL depicted in FIG. 4B or the line connecting both ends of the mount 25.

As depicted in FIG. 5B, the depressing projection 34 disposed on the upper housing 30 faces the click button 9 mounted on the rear surface of the touch pad unit 10. As depicted in FIG. 5C, when the end side of the touch pad unit 10 is clicked (pressed) by a finger of the operator, the touch pad unit 10 is deformed with respect to a rotation axis RA that positions in the border BL, and the click button 9 is pressed by the depressing projection 34.

Figure 6A:
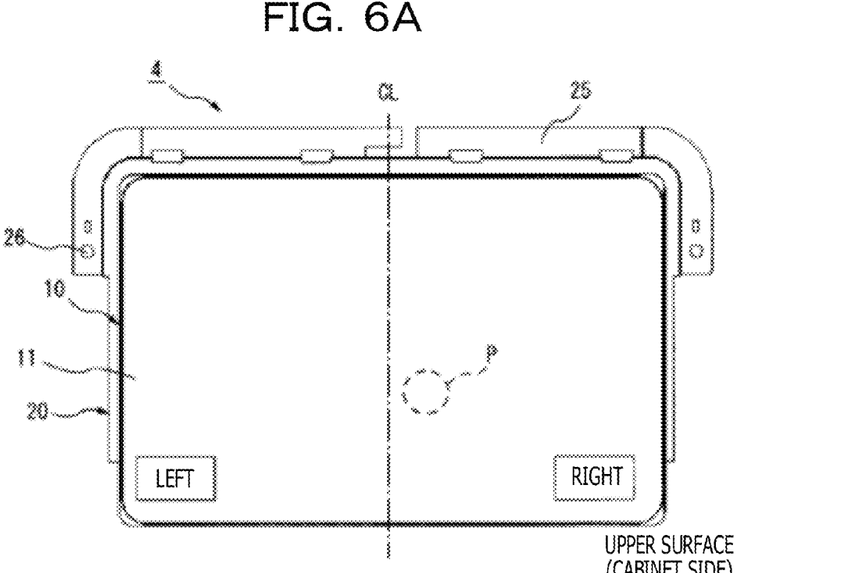
FIG. 6A depicts a front view of a touch pad.
Figure 6B:
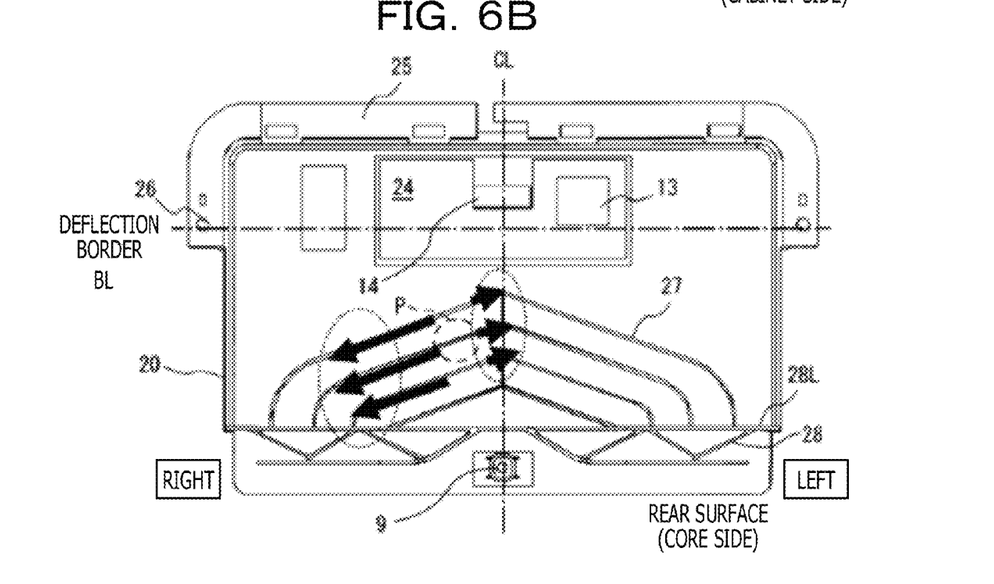
FIG. 6B depicts a back view of a touch pad.

FIG. 6A depicts a front view of a touch pad. FIG. 6B depicts a back view of a touch pad. A section indicated by a dotted line P at the right of a touch input surface 11 of the touch pad unit 10 depicted in FIG. 6A may be pressed. In FIG. 6B, the section on the rear surface corresponding to the dotted line P depicted in FIG. 6A is also indicated by a dotted line P. If the section indicated by the dotted line P is pressed, the plurality of ribs 27 formed on the touch pad cover 20 obliquely toward the linear rib 28L distributes depression force. In the distribution of depression force, more depression force is shifted to in the direction in which the touch pad cover 20 is easy to deflect and less depression force is shifted to the direction in which the touch pad cover 20 is not easy to deflect.

As a result, when the right part of the touch input surface 11 of the touch pad unit 10 is pressed, the deflection component is shifted to the right part of the touch pad cover 20 and the left part of the touch input surface 11 of the touch pad unit 10 is not deflected so much because the left part is not pressed. Similarly, when the left part of the touch input surface 11 of the touch pad unit 10 is pressed, the deflection component is shifted to the left part of the touch pad cover 20 and the right part of the touch input surface 11 of the touch pad unit 10 is not deflected so much because the right part is not pressed. Since the deflection correcting ribs 27 concentrates the deflection direction on one direction (left or right) regardless of the clicked position on the touch input surface 11 of the touch pad unit 10 as described above, the appearance is not degraded when the input surface 11 is pressed and input error may be reduced.

Figure 7A:
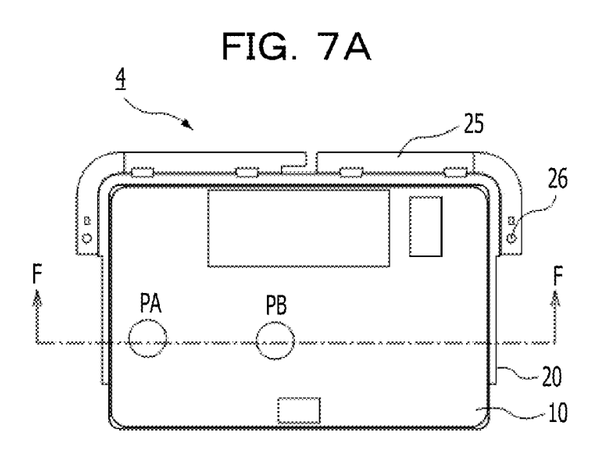
FIGS. 7A to 7D depict an example of a deflection correcting rib.
Figure 7B:
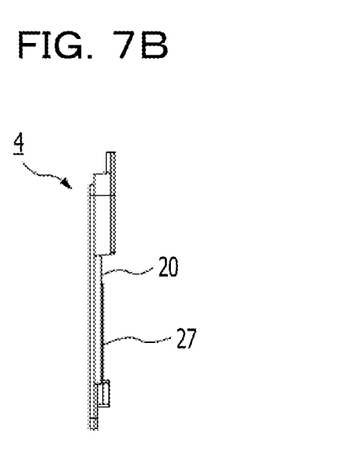
Figure 7C:
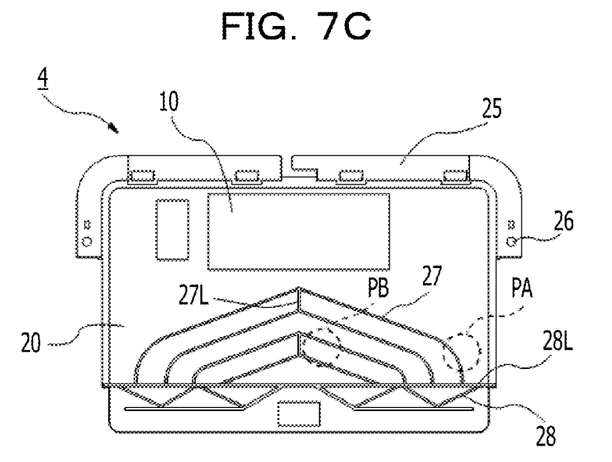
Figure 7D:
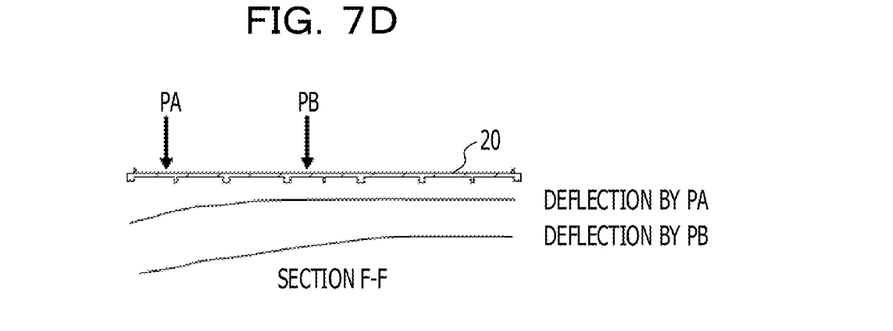
Figures 8A, 8B:
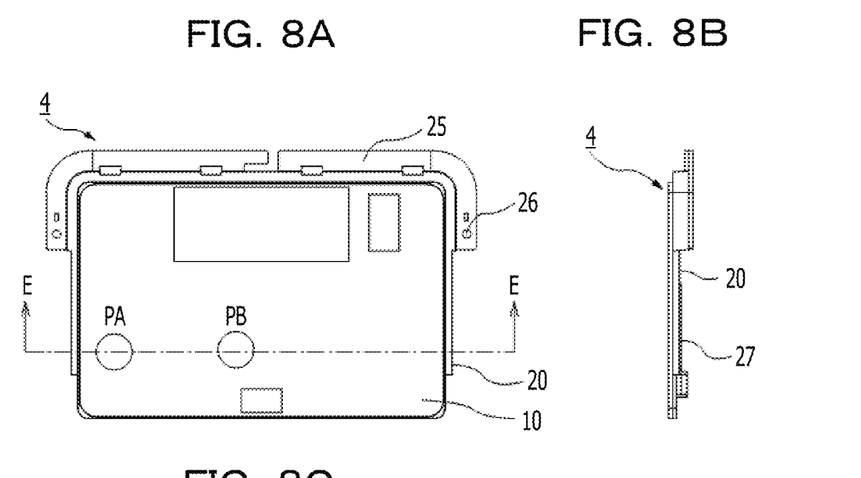
FIGS. 8A to 8D depict an example of a deflection correcting rib.
Figure 8C:
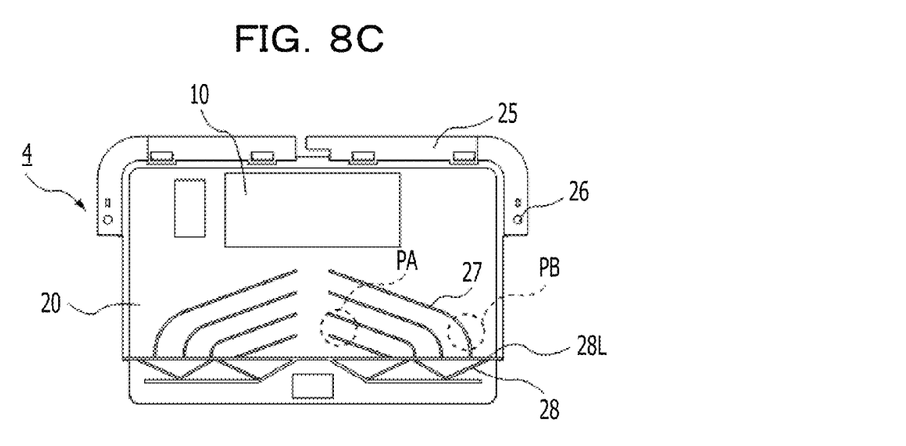
Figure 8D:
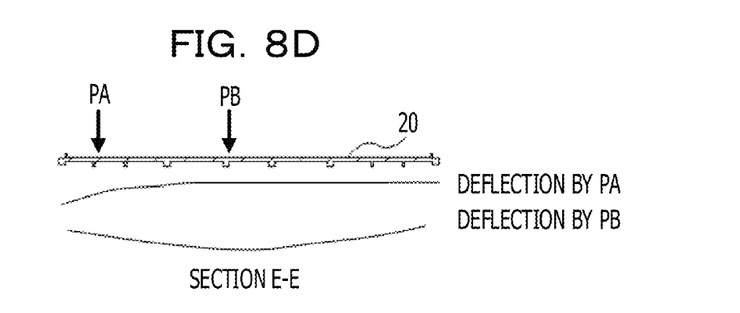
Figure 9A:
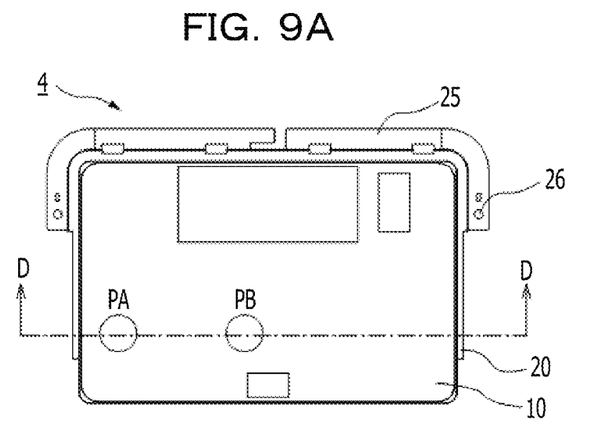
FIGS. 9A to 9D depict an example of a touch pad cover.
Figure 9B:
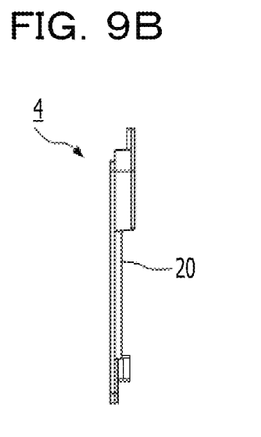
Figure 9C:
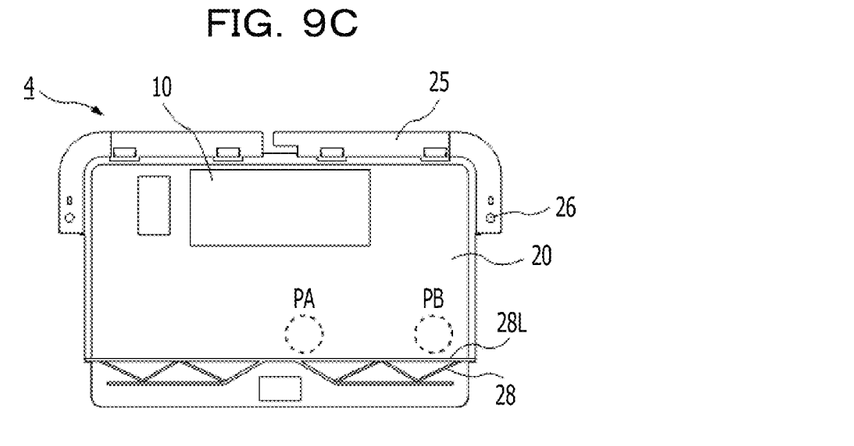
Figure 9D:
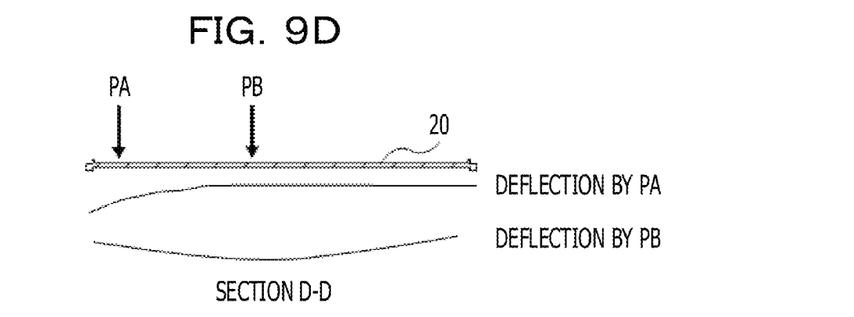

Effects of the plurality of deflection correcting ribs 27 disposed on the rear surface of the touch pad cover 20 will be described in comparison between the following three cases. The reinforcing rib 28 may be used in any of the following cases. FIGS. 7A to 7D depict an example of deflection correcting ribs. FIGS. 7A to 7D depict the case where the deflection correcting ribs 27 are disposed appropriately on the rear surface of the touch pad cover 20. FIGS. 8A to 8D depict an example of deflection correcting ribs. FIGS. 8A to 8D depict the case where the deflection correcting ribs 27 are disposed inappropriately on the rear surface of the touch pad cover 20. FIGS. 9A to 9D depict an example of a touch pad cover. FIGS. 9A to 9D depict the case where no deflection correcting ribs 27 are disposed on the rear surface of the touch pad cover 20. FIGS. 7A, 8A, and 9A depict clicked positions PA and PB on the touch input surface 11 of the touch pad unit 10. FIGS. 7B, 8B and 9B depict the side of the touch pad 4. FIGS. 7C, 8C and 9C depict the rear surface of the touch pad cover 20. FIGS. 7D, 8D and 9D depict the deflection of the touch pad cover 20.

When the deflection correcting ribs 27 are disposed appropriately on the rear surface of the touch pad cover 20 as depicted in FIG. 7D, the touch pad cover 20 is bent toward the pressed section, regardless of the pressed position on the touch pad unit 10. Accordingly, operation error during clicking may be reduced. When the deflection correcting ribs 27 are disposed inappropriately or no deflection correcting ribs 27 are disposed on the rear surface of the touch pad cover 20 as depicted in FIGS. 8D and 9D, the touch pad cover 20 is bent toward the pressed section if the pressed position is far from the center line of the touch pad unit 10. However, if the pressed position is close to the center line of the touch pad unit 10, the touch pad cover 20 is not bent toward the pressed section appropriately and the click button may operate incorrectly.

Figure 10A:
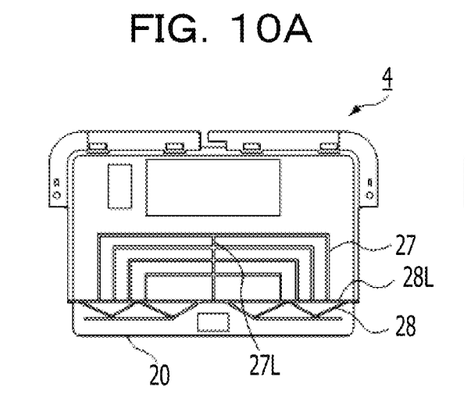
FIGS. 10A to 10E depict an example of a deflection correcting rib.
Figure 10B:
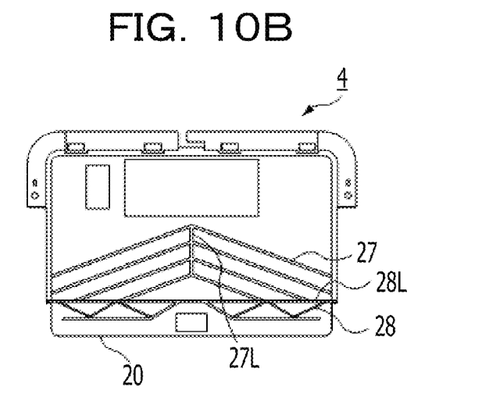

FIGS. 10A to 10E depict an example of a deflection correcting rib. FIGS. 10A and 10B depict the deflection correcting ribs 27 disposed on the touch pad cover 20 of the touch pad 4.

FIG. 10A depicts a rear view of the touch pad 4 having the touch pad cover 20. The deflection correcting ribs 27 of the touch pad cover 20 begin with the center line of the touch pad cover 20, extend orthogonally to the center line, bent in a direction parallel with the center line in midway, and reach the linear rib 28L. A communication rib 27L for communicating between the deflection correcting ribs 27 is disposed on the center line of the touch pad cover 20.

FIG. 10B depicts a rear view of the touch pad 4 having the touch pad cover 20. The deflection correcting ribs 27 of the touch pad cover 20 begin with the center line of the touch pad cover 20 and extend obliquely. Then, the deflection correcting ribs 27 excluding the uppermost rib 27 reach the linear rib 28L. The uppermost rib 27 ends with a side of the touch pad cover 20. The communication rib 27L for communicating between the deflection correcting ribs 27 is disposed on the center line of the touch pad cover 20.

Figure 10C:
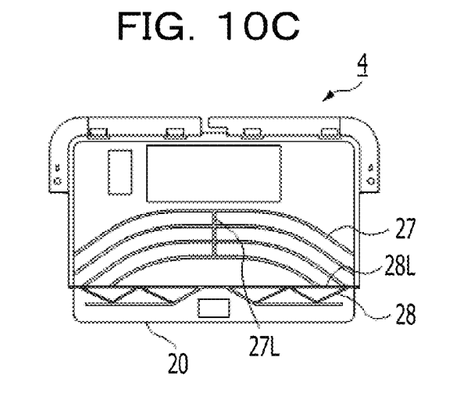

FIG. 10C depicts a rear view of the touch pad 4 having the touch pad cover 20. The deflection correcting ribs 27 of the touch pad cover 20 begin with the center line of the touch pad cover 20, extend orthogonally to the center line, and bent toward the lower end side in midway. In FIGS. 7A to 7D, for example, all of the curved portions of the ribs 27 reach the linear rib 28L. In FIG. 10C, however, the two uppermost ribs 27 may end with a side of the touch pad cover 20. The communication rib 27L for communicating between the deflection correcting ribs 27 is disposed on the center line of the touch pad cover 20.

Figure 10D:
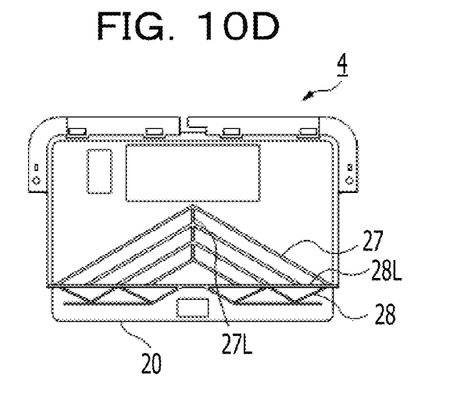

FIG. 10D depicts a rear view of the touch pad 4 having the touch pad cover 20. The deflection correcting ribs 27 of the touch pad cover 20 begin with the center line of the touch pad cover 20 and extend obliquely. The uppermost rib 27 ends with a side of the touch pad cover 20 in FIG. 10B, but all of the ribs 27 may end with the linear rib 28L in FIG. 10D. The communication rib 27L for communicating between the deflection correcting ribs 27 is disposed on the center line of the touch pad cover 20.

Figure 10E:
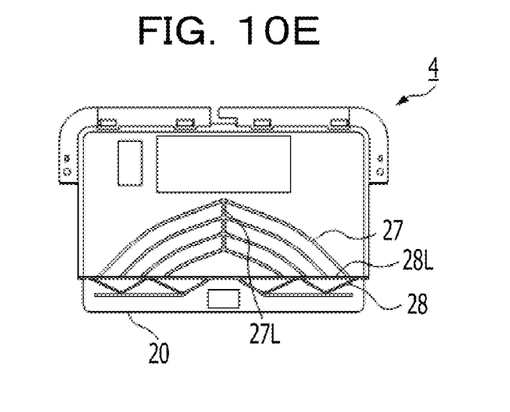

FIG. 10E depicts a rear view of the touch pad 4 having the touch pad cover 20. In FIG. 10D, the deflection correcting ribs 27 of the touch pad cover 20 begin with the center line of the touch pad cover 20 and extend obliquely. Then, all of the deflection correcting ribs 27 reach the linear rib 28L as straight lines. In FIG. 10E, the deflection correcting ribs 27 of the touch pad cover 20 begin with the center line of the touch pad cover 20 and extend obliquely, but all of the deflection correcting ribs 27 reach the linear rib 28L as curved lines, not straight lines. The communication rib 27L for communicating between the deflection correcting ribs 27 is disposed on the center line of the touch pad cover 20.

The shape of the deflection correcting rib 27 has only to be configured to concentrate the deflection of the touch pad cover 20 on the left or right side of the touch pad cover 20, regardless of the pressed position on the touch pad unit 10.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An input apparatus comprising:
    a touch pad configured to detect a touched position on an input surface;
    a click button provided on a rear surface of the touch pad; and
    a touch pad cover having a first face and a second face opposite to the first face, the first face of the touch pad cover being attached to the rear surface of the touch pad, the touch pad cover including a through hole which allows the click button to pass through the touch pad cover from the first face and expose from the second face,
    wherein the touch pad cover includes:
    a mount, provided on an upper side of the touch pad cover, configured to reduce deflection on an upper end of the touch pad cover; and
    a first area, including a plurality of ribs arranged at intervals and provided on a lower side of the touch pad cover, configured to distribute depression force to at least one of a first side and a second side of the touch pad cover when the depression force is applied on the input surface.

2. The input apparatus according to claim 1, wherein the touch pad cover includes a second area provided on an upper side of the touch pad cover and adjacent to the mount.

3. The input apparatus according to claim 1, wherein the plurality of ribs are disposed symmetrically about a center line of the touch pad cover, the center line differentiating the first side from the second side of the touch pad cover.

4. The input apparatus according to claim 1 further comprising,
    a reinforcing rib, disposed at both the first side and the second side on the second face of the touch pad cover, configured to reinforce a lower end of the touch pad cover.

5. The input apparatus according to claim 4, wherein the reinforcing rib includes a linear rib disposed orthogonally to the center line and positioned adjacent to an upper side of the through hole.

6. The input apparatus according to claim 4, wherein the plurality of ribs extend from a start point corresponding to the center line of the touch pad cover to an end point corresponding to the linear rib.

7. The input apparatus according to claim 4, wherein the plurality of ribs are disposed so that the plurality of ribs extend from a start point corresponding to the center line of the touch pad cover, some of the plurality of ribs extend to a first end point corresponding to the linear rib, and the remainder of the plurality of ribs extend to a second end point corresponding to one of ends of the first side and the second side of the touch pad cover.

8. The input apparatus according to claim 6, wherein at least one of the plurality of ribs includes curved portions between the start point and the end point.

9. The input apparatus according to claim 6, wherein at least one of the plurality of ribs is straight lines from the start point to the end point.

10. The input apparatus according to claim 1, wherein at least two of the plurality of ribs are coupled with each other via a communication rib arranged in parallel with a center line of the touch pad cover.

11. The input apparatus according to claim 1, wherein at least two of the plurality of ribs are coupled with each other on a center line of the touch pad cover via a communication rib.

12. The input apparatus according to claim 1, wherein the mount includes a planar part provided at the upper end of the touch pad cover.

13. The input apparatus according to claim 7, wherein the some of the plurality of ribs include curved portions between the start point and the first end point, and the remainder of the plurality of ribs include curved portions between the start point and the second end point.

14. The input apparatus according to claim 7, wherein the some of the plurality of ribs are straight lines from the start point to the first end point and the remainder of the plurality of ribs are straight lines between the start point and the second end point.

15. An electronic apparatus comprising:
    a housing; and
    an input apparatus coupled to the housing, the input apparatus includes:
    a touch pad configured to detect a touched position on an input surface;
    a click button provided on a rear surface of the touch pad; and
    a touch pad cover having a first face and a second face opposite to the first face, the first face of the touch pad cover being attached to the rear surface of the touch pad, the touch pad cover including a through hole which allows the click button to pass through the touch pad cover from the first face and expose from the second face, wherein the touch pad cover includes:
  a mount, provided on an upper side of the touch pad cover, configured to reduce deflection on an upper end of the touch pad cover; and
  an area, including a plurality of ribs arranged at intervals and provided on a lower side of the touch pad cover, configured to distribute depression force to at least one of a first side and a second side of the touch pad cover when the depression force is applied on the input surface.

16. The electronic apparatus according to claim 15, wherein the mount includes a planar part provided at the upper end of the touch pad cover.

17. The electronic apparatus according to claim 16, wherein a screw hole is disposed on a lower side of the mount and the input apparatus is mounted on the housing with a screw passing through the screw hole.

18. The electronic apparatus according to claim 17, wherein the click button faces a depressing projection disposed on the housing.

19. The electronic apparatus according to claim 16, wherein a plurality of securing holes are disposed in the mount and the upper end of the touch pad cover and the input apparatus is mounted on the housing with engaging projecting parts of the housing into the plurality of securing holes.

20. A touch pad comprising a ribs system on a surface of a touch pad cover,
  the ribs system comprising:
  deflection correction ribs; and
  reinforcing ribs provided on a lower side of the deflection correction ribs,
  wherein the deflection correction ribs extend from a center line of the surface of a touch pad cover toward the reinforcing ribs with an acute angle with respect to the center line, and the reinforcing ribs includes a first reinforcing rib, which is a linear rib provided substantially perpendicular to the center line and is coupled to deflection correction ribs, and second reinforcing ribs, which are provided obliquely against the first reinforcing rib and on an opposite side to the deflection correction ribs with respect to the first reinforcing rib,
  wherein the touch pad cover includes a deflectable area, including the deflection correction ribs and the reinforcing ribs and provided on a lower side of the touch pad cover, and an undeflectable area provided on an upper side of the touch pad cover.

* * * * *